United States Patent
Hady et al.

(10) Patent No.: US 6,856,944 B2
(45) Date of Patent: Feb. 15, 2005

(54) APPARATUS, METHOD AND SYSTEM FOR COUNTING LOGIC EVENTS, DETERMINING LOGIC EVENT HISTOGRAMS AND FOR IDENTIFYING A LOGIC EVENT IN A LOGIC ENVIRONMENT

(75) Inventors: Frank T. Hady, Portland, OR (US); Brad W Hosler, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/666,968

(22) Filed: Sep. 17, 2003

(65) Prior Publication Data
US 2004/0068395 A1 Apr. 8, 2004

Related U.S. Application Data

(63) Continuation of application No. 09/539,940, filed on Mar. 31, 2000, now Pat. No. 6,647,349.

(51) Int. Cl.[7] ............................................. G06F 3/05
(52) U.S. Cl. ...................... 702/188; 702/182; 702/183; 702/186
(58) Field of Search ................................ 702/178, 179, 702/181, 182, 186, 188, 60, 67; 370/392; 377/13, 15, 16

(56) References Cited

U.S. PATENT DOCUMENTS

| | | | |
|---|---|---|---|
| 4,656,580 A | | 4/1987 | Hitchcock et al. .......... 364/200 |
| 5,301,104 A | | 4/1994 | Yalamanchili .............. 395/800 |
| 5,327,129 A | * | 7/1994 | Soenen et al. .............. 341/120 |
| 6,018,803 A | * | 1/2000 | Kardach ..................... 713/323 |
| 6,026,139 A | * | 2/2000 | Hady et al. .................. 377/13 |
| 6,071,317 A | * | 6/2000 | Nagel ......................... 717/128 |
| 6,418,405 B1 | * | 7/2002 | Satyamurti et al. ......... 704/206 |
| 6,564,175 B1 | * | 5/2003 | Hady et al. ................. 702/186 |
| 6,647,349 B1 | * | 11/2003 | Hady et al. .................. 702/89 |

* cited by examiner

Primary Examiner—Marc S. Hoff
Assistant Examiner—Felix Suarez
(74) Attorney, Agent, or Firm—Kenyon & Kenyon

(57) ABSTRACT

A method for identifying a logic event in a logic environment, the method including providing one of a reference parameter and a next reference parameter, receiving starting event information corresponding to a logic event, ending event information corresponding to the logic event, and at least one identification parameter information associated with the logic event, determining an actual parameter corresponding to at least one of a duration parameter and a capacity parameter corresponding to the logic event, comparing the actual parameter to the reference parameter and providing a comparison result, and if the comparison result at least indicates that the actual parameter is no less than the reference parameter, performing at least one of replacing the reference parameter with the actual parameter to provide the next reference parameter and providing the at least one identification parameter.

16 Claims, 6 Drawing Sheets

APPARATUS, METHOD AND SYSTEM FOR COUNTING LOGIC EVENTS, DETERMINING LOGIC EVENT HISTOGRAMS AND FOR IDENTIFYING A LOGIC EVENT IN A LOGIC ENVIRONMENT

RELATED/PRIORITY APPLICATION INFORMATION

This application is a continuation of and claims the benefit and priority of U.S. patent application Ser. No. 09/539,940, filed Mar. 31, 2000, now U.S. Pat. No. 6,647,349, all of which is incorporated herein by reference.

FIELD OF THE INVENTION

The present invention concerns an apparatus, method and system for counting logic events, determining logic event histograms and for identifying a logic event in a logic arrangement or environment.

BACKGROUND INFORMATION

For system performance tuning, it is believed that the capability to measure particular characteristics, such as various performance characteristics, of a processor platform or system facilitates the ability to "tune" such systems to determine where improvements may be made. Types of instrumentation approaches that may be used to measure various system characteristics may include counter-based instrumentation and trace-based instrumentation.

The trace-based instrumentation approach may use external hardware to probe a system to collect and store long operating "traces". Such trace-based instrumentation may include some arrangement or structure for post-processing the collected traces to provide certain data, including charts. While relatively complex metrics (such as, for example, distributions across certain operating conditions) may be gathered using trace-based instrumentation rather than counter-based instrumentation, trace-based instrumentation may be relatively expensive. Thus, for example, a relatively large memory may be required to store the collected traces if the experiment is a "long" one. Also, some of the system signals may be physically inaccessible to external hardware.

While a logic analyzer trace approach may be used to provide histogramming or single event measurements, such tracing may be limited to collecting measurement statistics based on externally available signals. Such an approach may, for example, provide relatively limited sampling of only a relatively small subset of the total "traffic" on a bus as trace memory fills quickly and empties slowly. Further, higher speed point-to-point busses may make the logic analyzer tracing approach more difficult or impractical. Also, validating the performance of, for example, a bus interface requires measuring throughputs and latencies. Although this may be done with logic analyzers that may be coupled to busses driven by exerciser cards, this may be relatively expensive, difficult and/or time-consuming.

The counter-based instrumentation approach may use a counter to count a number of events occurring over some sample period. Such counter-based instrumentation may be included on some integrated circuit devices so that data may be collected from internal signals. This approach may determine average metrics, such as throughput, using the counter. One counter-based circuit arrangement is described in U.S. Pat. No. 6,018,803, which issued on Jan. 25, 2000 and which is assigned to Intel Corp. Additionally, U.S. Pat. No. 6,026,139, which issued on Feb. 15, 2000 and which is assigned to Intel Corp., describes an integrated counter-based instrumentation for generating a frequency distribution or histogram. While histograms of, for example, bus latencies and burst sizes may be important, it is believed that at least for some types of workloads (such as, for example, real-time workloads), identifying certain single events may also be important.

In this regard, deficient or faulty system components within a system may damage system performance in ways that may be difficult to find or identify. Thus, for example, if graphics cards do not accept write-data from the processor for relatively long periods of time (such as milliseconds), this may, for example, cause video or audio glitches. At present, such a problem may be addressed with relatively great difficulty and/or expense by developing a specialized peripheral component interface card that may be used to aid in finding such events.

Accordingly, it is believed that there is a need for an instrumentation architecture, apparatus, method and system that is capable of counting or measuring logic event parameters, collecting or determining histogram information of various metric values, such as, for example, performance characterizing parameters, and identifying single logic events that may affect performance so as to better allow any one or more of the above desired results.

Additionally, estimating application runtimes for proposed system hardware and/or software configuration changes may be problematic. While, for example, a processor bus first word latency metric may indicate system performance at some level, it may only be sufficient under certain limited conditions.

Accordingly, it is believed that there is a need for an apparatus, method and system for determining estimated application runtimes based on histogram or distribution information.

DETAILED DESCRIPTION

Figure 1:
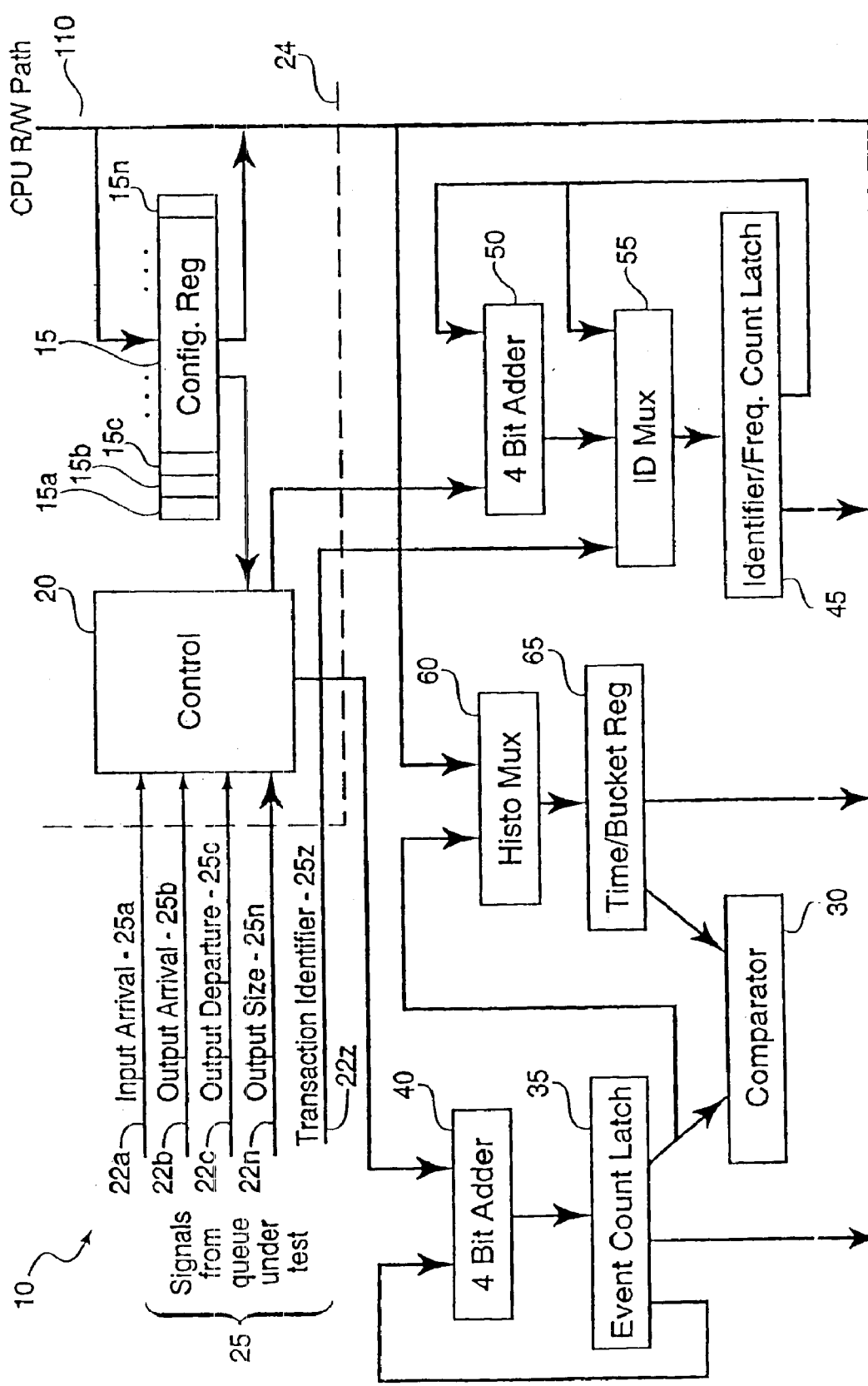
FIG. 1 shows a block diagram of an instrumentation apparatus or measurement system of an exemplary embodiment of the present invention.

A block diagram of an instrumentation apparatus or measurement arrangement 10 of an exemplary embodiment of the present invention is shown in FIG. 1. The measurement arrangement may be used to measure various metrics, such as performance characterizing signals in one or more ways, including event counting, event histogramming and identifying a single logic event.

Figure 2:
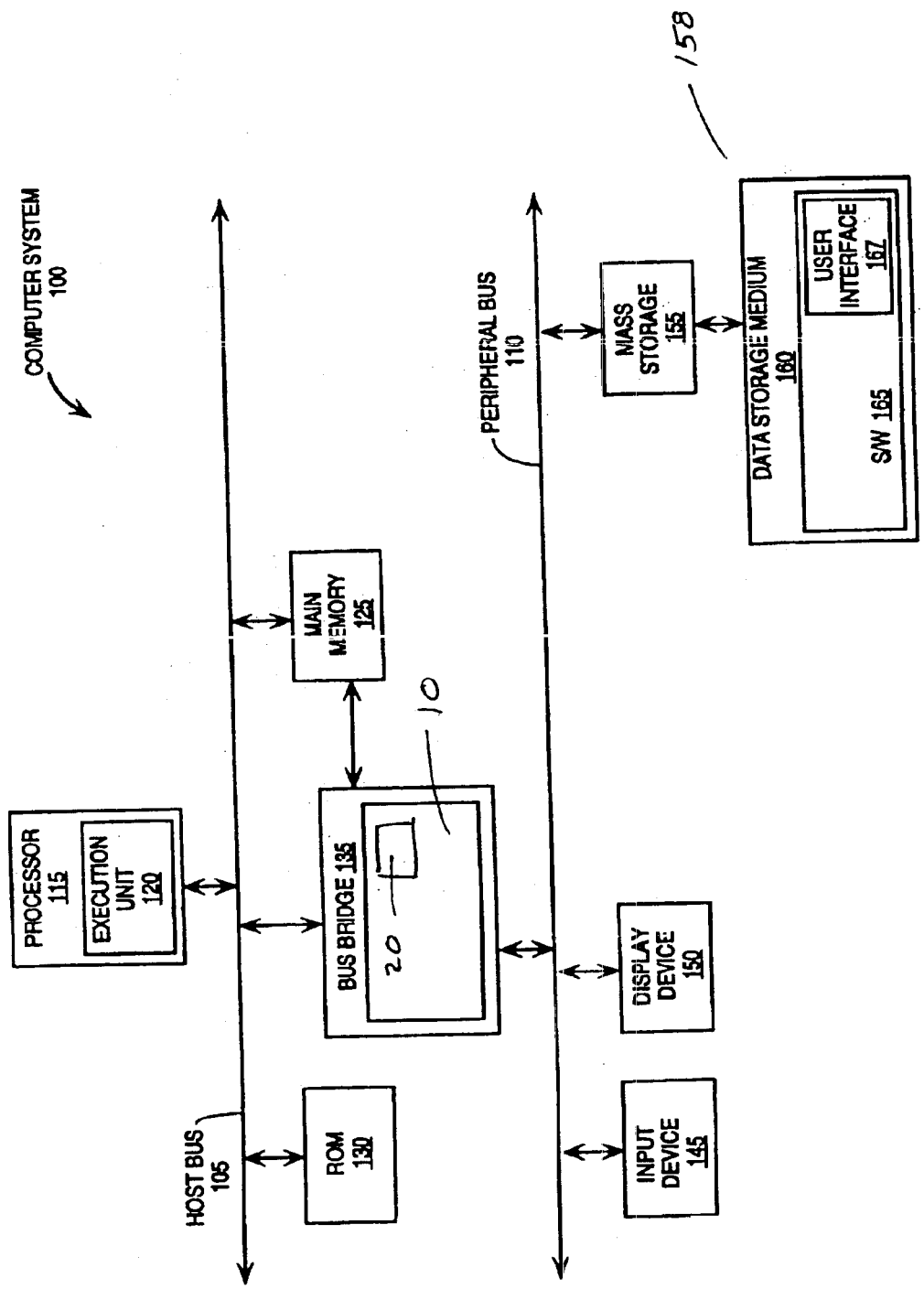
FIG. 2 shows a block diagram of a system architecture, in which the logic arrangement may include the instrumentation or measurement system of FIG. 1.

The measurement arrangement 10 may be arranged or configured in the exemplary computer system 1 of FIG. 2.

Of course, other suitably appropriate logic arrangements, including computer systems configured in other ways, may also be used in alternative embodiments. The exemplary computer system 1 includes a host bus 105 and a peripheral bus 110, which may be, for example, a peripheral component interconnect (PCI) bus. A processor 115 or some other suitably appropriate logic arrangement may be coupled to the host bus 105. The processor 115 may include an execution unit 120 to execute instructions and a main memory 125 that may be coupled to the host bus 105 to store information and instructions for use by the processor 115. As shown, a non-volatile memory, such as, for example, a read-only-memory (ROM) 130, may be coupled to the host bus 105 to store information for use by the processor 115. Also, as shown, a bus bridge device 135 may be used to communicate information between the host bus 105 and the peripheral component interface bus 110. The bus bridge 135 may also be coupled to the peripheral component interface bus 110, and may perform other operations, such as, for example, memory access control for the main memory 125. The bus bridge 135 may include the instrumentation or measurement arrangement 10, which is described further below with respect to FIG. 1.

Also as shown in the exemplary computer system 1 of FIG. 2, an input device 145, such as, for example, a keyboard and/or cursor control device, a display device 150, such as, for example, a monitor or liquid crystal display, and a mass storage device 155 may be coupled to the peripheral component interface bus 110. The computer system 1 may also include a data storage medium 160 corresponding to the mass storage device 155. Thus, for example, if the mass storage device 155 is a CD-ROM drive, the data storage medium 160 may be a compact disc read-only memory (CD-ROM). In an exemplary embodiment, the data storage medium 160 may be used to store measurement data representation software 165. The measurement data representation software 165 may include a user interface 167, which may cause various prompts, menus, data entry fields and/or other information to be displayed on the display device 150. A user may input information through the one or more input devices 145 when interacting with the user interface 167. In an exemplary embodiment, suitably appropriate measured data and/or frequency distribution representation software 165 may be initially stored on the data storage medium 160 and then subsequently loaded into the main memory 125 for execution by the execution unit 120 of the processor 115. In other exemplary embodiments, the representation software 165 may be stored in another memory of the computer system 1.

As shown in the exemplary embodiment of FIG. 1, the measurement arrangement 10 includes a configuration register arrangement 15, which may include one or more registers or other storage arrangements 15a, 15b, 15c, . . . , 15n, a control arrangement 20, which may be any suitably appropriate controller or processor arrangement, a comparing arrangement 30 (such as a comparator), an event count latch arrangement 35 or other storage arrangement, an adder or incrementer arrangement 40, a single event identifier and frequency count latch arrangement 45 or other such storage arrangement, a multiplexer 55, an adder or incrementer arrangement 50, a "time/bucket" register 65 or other storage arrangement and a histogram multiplexer 60. As shown, the histogram multiplexer 60 may multiplex in a new count for an event from the event count latch 35 or an initial or reset value from the system to the "time/bucket" register 65.

The identifier/frequency count latch 45 may operate as an identifier latch when a transaction identifier (such as an address associated with a logic event) is multiplexed through the ID multiplexer 55, and it may operate as a count latch or a frequency count latch when an incremented value of the adder arrangement 50 is multiplexed through the multiplexer 55. In either case, the identifier/frequency count latch 55 may be initialized or reset when the system inputs an initializing or reset value through the multiplexer 55.

The adder arrangement 40 may be included to provide flexibility in the configuration of the system. If eliminated, then the event count latch arrangement 35 may be replaced by another simpler counter arrangement. The adder arrangements, latch arrangements, multiplexer arrangements and other components may be suitably "bit-sized" depending on the particular application and data requirements. Thus, for example, the adders 40 and 50 may be four-bit adders depending on the application and data requirements, as well as the available system resources.

The controller arrangement 20 may be coupled to the adder arrangements 40 and 50, and includes logic (which may be hardware or software depending on the application) to control the operation of the adder arrangements 40 and 50. Although not shown, one or more suitably appropriate clock signals, which may be, for example, an internal chipset clock signal or other type of clock signal, may be coupled to controller arrangement 20, the latch arrangements 35 and 45 and any other components that may use such clocking signals. Measurement and configuration data may be communicated over the processor (CPU R/W) path, which may include, for example, the peripheral component interface bus 110, and through the configuration registers 15a, 15b, 15c, . . . , 15n. The configuration data may be used to "set up" the measurement arrangement or system 10 for various operations, including event counting, histogram operations or single event identification.

The instrumentation or measurement arrangement 10 may be used to measure various types of "metric" parameters (metrics) or corresponding signals that characterize or correspond to various performance parameters of a logic arrangement, such as a processor. This may, of course, depend on which of the available signal lines to which the controller arrangement 20 may be coupled. As shown in the exemplary embodiment of FIG. 1, the controller arrangement 20 may be coupled to the processor/host bus block 25, which may include the processor 115 and the host bus 105, for receiving various logic arrangement signals 25a, 25b, 25c, . . . , 25n, which may be a single-bit, multi-bit or any other suitably appropriate signal depending on the application. As shown, signal lines 22a, 22b, 22c, . . . , 22n may, for example, correspond respectively to a first single line 22a, a second single line 22b, a third single line 22c, a multi-bit line 22n and/or a multi-line arrangement 22z. Also, as shown, a multi-bit transaction address identifier 25z (or some other suitably appropriate transaction identifier) may be communicated directly to the identifier multiplexing arrangement 55 by using, for example, the multi-line arrangement 22z.

As shown, the logic arrangement signals 25a, 25b, 25c, . . . , 25n may correspond to signals from a particular queue or buffer associated with the logic arrangement, such as, for example, the processor 115, that is being tested. Also, as shown, the logic arrangement signals 25a, 25b, 25c, . . . , 25n may include an input arrival signal 25a, which may, for example, correspond to a signal indicating the arrival of data in an input buffer of the logic arrangement, an output arrival signal 25b, which may, for example, correspond to a signal indicating the arrival of data in an output buffer, an output departure signal 25c, which may, for example, correspond to a signal indicating the departure of data in the output buffer, and an output size signal, which may, for example, correspond to a signal corresponding to or indicating the bit or byte size of data in the output buffer. The buffer arrangements may include, for example, processor-to-bus buffers, chipset-to-bus buffers, bus-to-chipset buffers, chipset-to-DRAM buffers, DRAM-to-chipset buffers, as well as other buffer and other "throughput" arrangements.

Depending on the application, the measurement arrangement 10 may include another multiplexing arrangement, which may, for example, be included in the controller arrangement 20, for selectively coupling different ones of the logic arrangement signals 25a, 25b, 25c, ..., 25n at different times or based on some other suitably appropriate selection logic. In this way, the measurement arrangement 10 may be used to measure a variety of different types of metrics by selecting different ones of the logic arrangement signals 25a, 25b, 25c, ..., 25n.

The comparing arrangement 30 may be coupled to the event count latch arrangement 35 and to the time/bucket register arrangement 65 to receive an "event count" value and a "time/bucket" value, which may then be compared. If, for example, the count for an event is greater than or equal to the "time/bucket" value, then this comparison information or result may be provided to the controller arrangement 20, which may then re-initialize or otherwise reset the adder arrangement 40 to a "zero" value. Depending, for example, on the particular application the comparing arrangement 30 may determine whether a particular count is greater than, less than, greater than or equal to, or less than or equal to a particular reference value. Thus, for example, the particular test to be performed may depend on the particular experiment being performed and/or the type or "granularity" of a frequency distribution of the desired information.

It is believed that such a common architecture may minimize or at least reduce hardware requirements by using common components for each of the three types of measurements. In this regard, for example, a counter used to count events may also be used to count trials when collecting histograms or when identifying single events. It is believed that such an architecture may be used to provide, for example, one or more of the following benefits.

The present system may provide multiple measurement features and therefore allow faster application characterization to enable a wider range of applications to be profiled. It is also believed that such a system may better allow the collection of comparable or readily understandable statistics by many different groups. Such information may be used by platform architects or designers to better "tune" or optimize processors, chipsets or other logic arrangements. It is also believed that such a system may facilitate component validation, since such validation requires the finding and fixing of "bugs". Validating the performance of a bus interface, for example, may require measuring throughputs and latencies, the present instrumentation system may facilitate such testing by eliminating or at least reducing any manual scan traces, download traces or parse traces. Such instrumentation may also improve test setup times by eliminating or at least reducing the time needed to setup and test a logic analyzer as part of a testing apparatus. Additionally, such instrumentation may also make "what-if" experiments faster, simpler or more complete since event counts, histograms and single event identification may all be used. Since software developers may need tools to properly "tune" code to new platforms, such instrumentation may allow tuning based on usage feedback from the system, rather than through trial-and-error tuning.

In the FIGS. 3 to 6 are shown four methods that describe the operations or tasks that the systems of FIG. 1 and/or FIG. 2 may perform for each of three different types of measurement. In particular, the systems of FIG. 1 and/or FIG. 2 may enable the use of any one or more of the three types of measurements in a system that may be relatively compact and/or relatively inexpensive. The system of FIG. 1 and/or FIG. 2 may be used to perform any one or more of three types of measurements or statistics, including average statistics, histogram information and identifying single events.

First, average statistics may be measured by counting events by using one or even both of the adder arrangements 40 and 50 and the identifier latch arrangement 45 over a measured period of time. Such statistics may include, for example, throughput and bus utilization information. While only two adder and/or counting arrangements are shown, the system may also include a larger plurality of parallel adder and/or counting arrangements to enable essentially simultaneous collection of information data concerning any number of event types.

As shown in FIG. 1, measurement arrangement 10 may be operated in a first counting mode for a particular event type as follows. The user system 158 may be used to first set the measurement arrangement 10 in the counting mode. The controller arrangement 20 or the user system 158 may then provide an incrementing value to one or both of the adder arrangements 40 and 50, and also may initialize the event count latch 35 and/or the frequency count latch 45. Because of the flexibility of the measurement arrangement 10, either or both of the event count latch arrangement 35 and the frequency count latch arrangement 45 may be used to count the time (or byte information) corresponding to the time between a start of an event and a stopping of a particular event that is being monitored. Although, adder arrangements and count latch arrangements are shown, the system could simply use a simpler counter arrangement if, for example, the counting flexibility of an adder is not required. The adder arrangement 40 and/or 50 (which may be, for example, 4-bit adder arrangements depending on the application) may simply add a suitably appropriate incrementing value, such as, for example, a one (1) corresponding to clocking signals occurring between the starting and stopping of a logic event or transaction. The incrementing value may also, for example, correspond to an output size for throughput statistical determinations.

As shown, the event count latch 35 and/or the frequency count latch 45 may feedback the prior or initial count (at a prior time, such as, for example, (t−1)) to the adder arrangement 40 and 45, respectively, which then adds the prior or initial count to the incrementing value to determine the current count. The adder arrangements 40 and/or 50 may then output the current count value and/or values to a lower bit range (such as 24 bits) of the event count latch arrangement 35 (which may be, for example, a 24-bit latch arrangement depending on the application) and/or the frequency count latch arrangement 45 (which may be, for example, a 36-bit latch arrangement depending on the application). Finally, the user system 158 and/or the controller arrangement 20, may be used to obtain the count value(s) from the count latch arrangement 35 and/or 45 and to reset the latch arrangements to prepare for a new counting run if necessary. The representation software 165 may then be used to determine count statistic information based on the count or counts of the event or events that are being monitored.

Second, histograms that total a relative amount of time or a percentage of time that a particular metric may be one of any number of values may be measured using all of the features of the instrumentation or measurement arrangement 10 of FIG. 1. Thus, for example, a given workload or test may be run once for each trial class or bucket (which may be a collection of metric values grouped together) within a final histogram. For each run, a minimum value of the histogram bucket may be stored in the bucket register arrangement 65. Within each run, there may be a number of trials counted independently (but not simultaneously). Thus, for example, in counting burst size, bytes may be counted for each transaction across a bus, and the byte count may be zeroed or otherwise initialized when a transaction ends. Also, for each run, the number of trials for which a count exceeds a minimum bucket value may be totaled, and one run may be needed for each bucket within the histogram. Such histogramming statistics may be used to provide detailed usage information to tune various software packages and/or hardware arrangements, platforms or systems.

With respect to FIG. 1, the user system 158 may be used to set the measurement arrangement 10 to a histogram measurement operating mode. Following this, the system may initialize the event count latch 35 and the frequency count latch 45, and may then set the bucket register arrangement 65 to an initial or minimum bucket value, such as zero, through the histogram multiplexer 60. Next, the controller arrangement 20 determines whether an event may be a start event, and, if it is, it may reset the event count latch arrangement 35 to an initial value, such as zero. The system may then increment the count corresponding to, for example, the clock count of an event time period that is initiated by the start event. To do this, the adder arrangement 40 may increment a prior count value, and the new incremented value may be latched into the event count latch 35. This may be done on each clock cycle or some other suitably appropriate parameter (such as, for example, byte size for throughput determinations).

Next, the controller arrangement 20 may determine whether the event may be a stop event, and if it is, then the comparing arrangement 30 compares the count of the event count latch arrangement 35 and the bucket register arrangement 65. If the comparing arrangement 30 determines that the count for an event may be at least greater than (or greater than or equal to) the bucket value, then the frequency count latch arrangement may be incremented using the adder arrangement 50. Next, the system may initialize or reset the event count latch arrangement 35 to an initial value, such as zero. The system may also then determine whether the foregoing operating steps are to be repeated, which will depend on the particular application. If not, the system may read or obtain the frequency count in the frequency count latch arrangement 45. Finally, the system may set up or prepare for the next bucket register arrangement value, and the system may then repeat the above operations to obtain another bucket value for a particular event.

Third, a single event may be identified by having the user system 158 set the instrumentation or measurement arrangement 10 to a single event identification mode. In such a case, the output information may be sufficiently detailed to identify a single interesting or particular event or transaction. As with histogramming, the instrumentation or measurement arrangement 10 may count a number of separate trials during a single run, such as, for example, each PCI master request for a main memory read. For each of these trials, the counted value may be compared to a current maximum value in the time register arrangement 65. If the value of a trial exceeds that of all prior trials, then a new count may be latched in the time register arrangement 65 and a new identifier (such as, for example, a memory address or other suitably appropriate identifier) may be latched into the identifier register arrangement 45. Such single-event identification capabilities are believed to be useful, for example, in evaluating "isochronous" workloads on a platform, where, for example, identifying single spurious events (such as, for example, a momentary freeze in a video signal).

If the single event identification mode of the instrumentation or measurement arrangement 10 has been set by the user system 158, then the system may initialize the identifier latch arrangement 45 and the time register arrangement 65 to a suitably appropriate initial value, such as zero. Next, the system may determine whether the event may be a start event, and if it is, then it may reset the event count latch arrangement 35. Next, the count in the event count latch arrangement 35 may be incremented by the adder 40 on each clock cycle. Next, the system may determine whether the event may be a stop event, and if it is then the comparing arrangement 30 may compare the count of the event count latch arrangement 35 and the time register arrangement 65. If the count for an event is greater than or equal to (or greater than) the time register arrangement value, then the count for an event may be loaded into the time register arrangement and the system may latch the corresponding identifier (such as, for example, an address) into the identifier latch arrangement 45. Next, the event count latch arrangement 35 may be initialized or reset, and the system may determine whether the foregoing operating steps are to be repeated based on whether a suitably appropriate end condition, continuation condition or other repeat condition is satisfied, which will depend on the particular application. If not, the system reads the identifier latch arrangement 45 and the time register arrangement 65, and ends the process or prepares for the next process.

Figure 3:
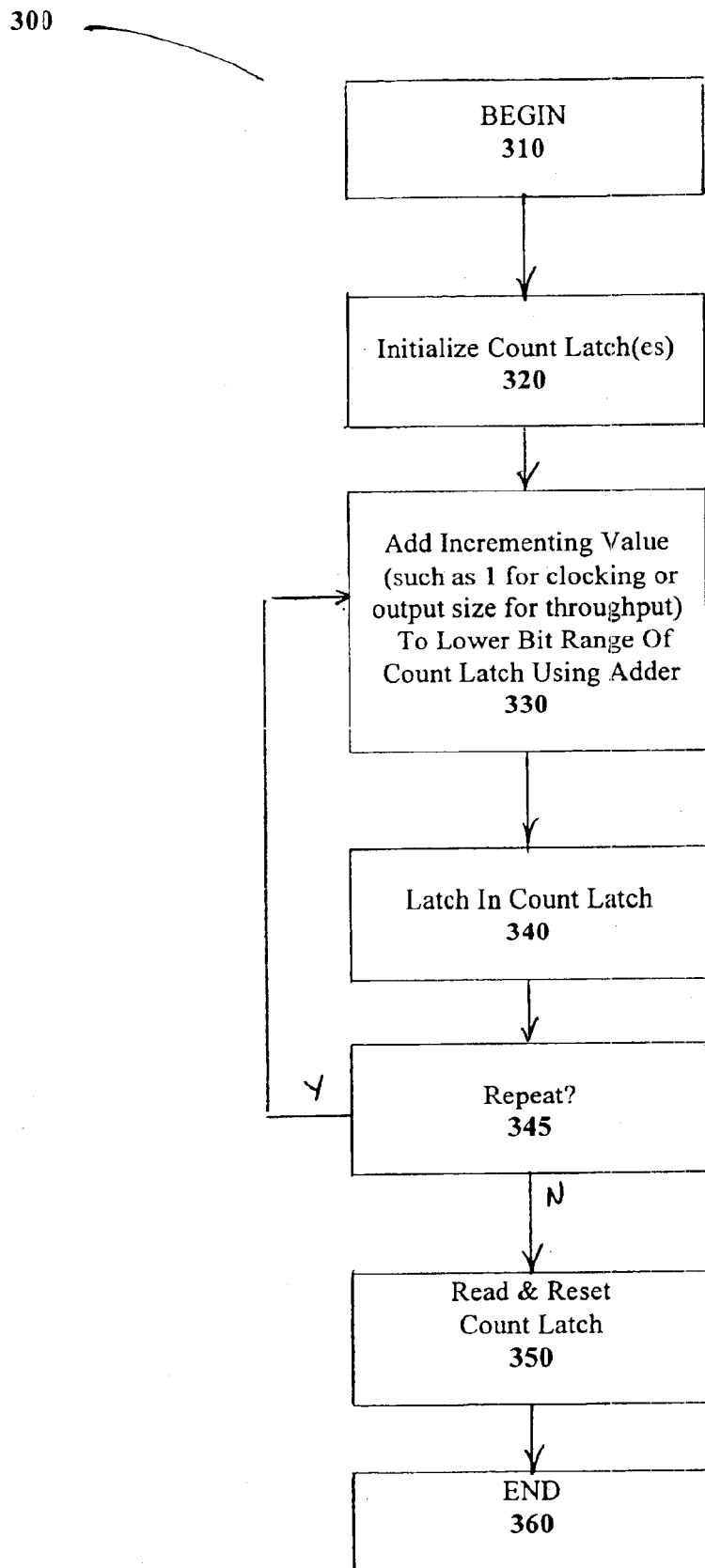
FIG. 3 shows a flowchart of an exemplary embodiment of one aspect of a method that may be implemented using the exemplary embodiments of FIG. 1 and/or FIG. 2.

As shown in FIG. 3, a flowchart details the steps of an exemplary embodiment of one aspect of an event counting method that may be used. In particular, the sub-method 300 begins in step 310. Next, in step 320, the system processor may initialize one or both of the count latches 35 and 45. Because of the flexibility of the measurement arrangement 10, either the event count latch arrangement 35 or the frequency count latch arrangement 45 may be used. In step 330, the adder arrangement 40 or 50 (which may be, for example, a 4-bit adder depending on the application) adds a value, such as, for example, a one (1) for some event or an output size for throughput determinations, to a lower bit range (such as 24 bits) of the event count latch arrangement 35 (which may be, for example, a 24-bit latch arrangement depending on the application) or the frequency count latch arrangement 45 (which may be, for example, a 36-bit latch arrangement depending on the application) using the adder arrangement 40 or 50, respectively. In step 340, the system latches in the value in the count latch arrangement 35 or 45. Next, in step 345, the system determines whether to repeat the process based on whether a suitably appropriate end condition, continue condition or other repeat condition is satisfied. If it is determined that the process is to be repeated or continued, then the system may branch to step 330. Otherwise, in step 350, the system may read and reset the count latch arrangement 35 or 45, and the method may be ended in step 360.

In this regard, count events may, for example, include the following: queue arrivals, in which the system counts each active or true input arrival logic arrangement signal; data throughput, in which the system accumulates the output size signals each time an output arrival signal may be active or true; and queue busy time, in which the system starts counting clock cycles for active or true output arrival logic arrangement signals, and stops counting clock cycles for active true output departure logic arrangement signals and inactive or not true output arrival logic arrangement signals.

Figure 4:
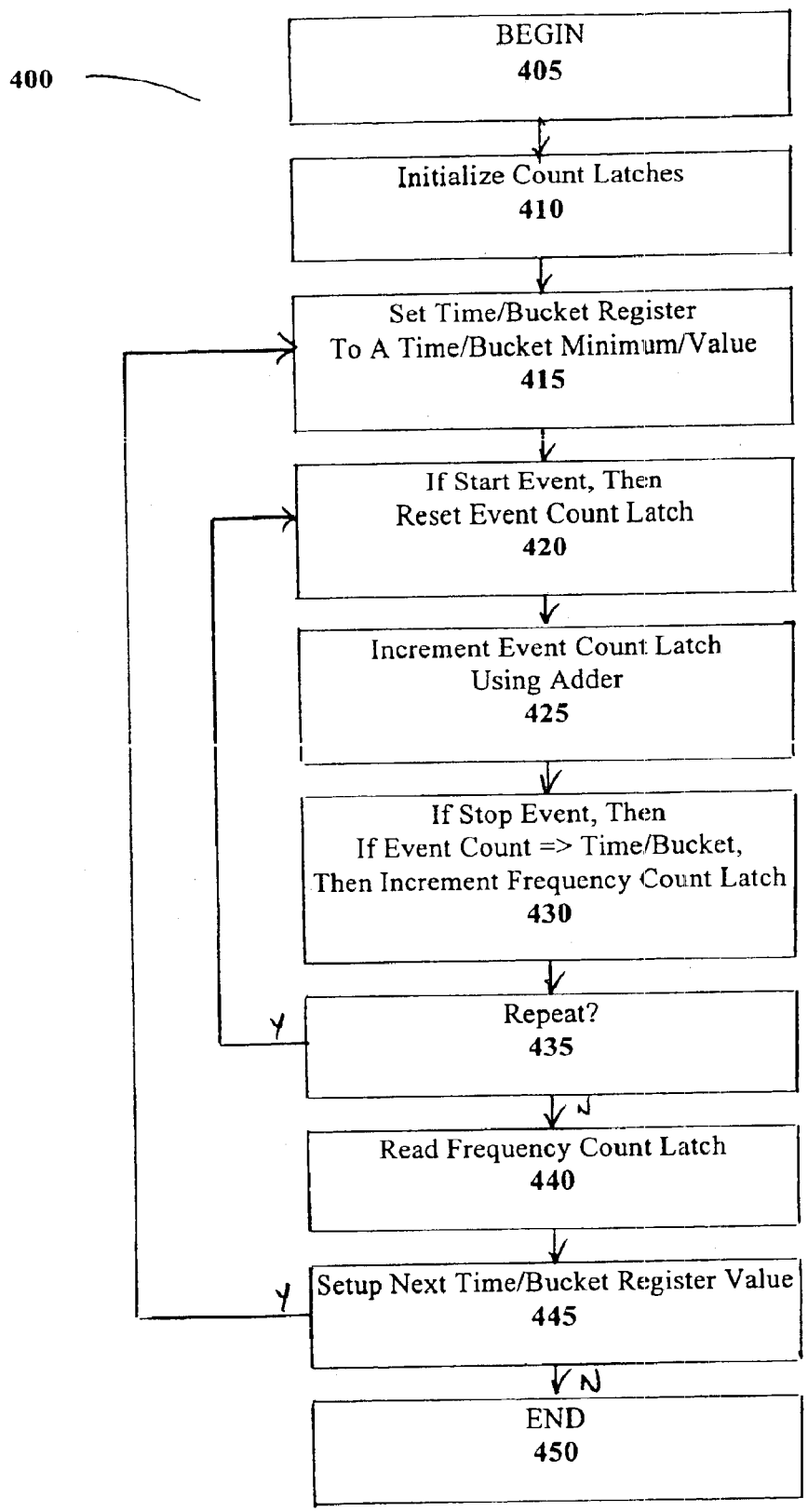
FIG. 4 shows another flowchart of an exemplary embodiment of another aspect of a method that may be implemented using the exemplary embodiments of FIG. 1 and/or FIG. 2.

As shown in FIG. 4, a flowchart details the operations or tasks of an exemplary embodiment of another aspect of a histogramming method that may be used. In particular, the sub-method begins in step 405. Next, in step 410, the system may initialize the count latches 35 and 45. In step 415, the system sets the bucket register arrangement 65 to a minimum bucket value. In step block 420, the system may determine whether an event may be a start event, and, if it is, it may reset the event count latch arrangement 35 to an initial value, such as zero. In step 425, the system increments the event count latch arrangement 35 using the adder arrangement 40 on each clock cycle. Next, in step block 430, the system may determine whether the event may be a stop event, and if it is, then the comparing arrangement 30 compares the contents of the event count latch arrangement 35 and the bucket register arrangement 65. If the comparing arrangement 30 determines that the count for an event may be at least greater than (or greater than or equal to) the bucket value, then the frequency count latch arrangement may be incremented using the adder arrangement 50. In step 435, the system may then determine whether the foregoing operating steps 425 to 430 are to be repeated based on whether a suitably appropriate end condition, continue condition or other repeat condition is satisfied, which will depend on the particular application. If not, in step 440, the system reads the frequency count latch arrangement 45. Next, in step 450, the system sets up the next bucket register arrangement value, and ends the sub-method in step 450.

In this regard, time-based histograms may, for example, include the following histogram events. It is noted, however, that since only one "bucket" of a histogram may be measured per experiment, histograms may be generated for repeatable workloads. As a first example, the system may measure a logic arrangement or chipset-to-PCI queue service time distribution, which may include the following steps: setting the bucket register to a minimum value of a maximum histogram bucket; using an active or true output arrival logic arrangement signal (that is, a start event) to reset and start the appropriate counter; and using an active or true output departure logic arrangement signal (that is, a stop event) to stop the same counter and cause the comparing arrangement 30 to compare the count for an event and the bucket register value; and repeating these steps for each minimum bucket value.

As another example, the system may determine an inter-arrival time distribution for a processor bus transaction queue or a processor bus in-order-queue. This may include the following steps: setting the bucket register arrangement 65 to a minimum value of a maximum histogram bucket value; using an active or true input arrival signal (from the queue (that is, a start event) to reset and start the appropriate counter, and using an inactive or not true input arrival signal (from the queue) (that is, a stop event) to cause the comparing arrangement 30 to compare the count for an event and the bucket register value and then reset the appropriate counter; and repeating these steps for each minimum bucket value.

Figure 5:
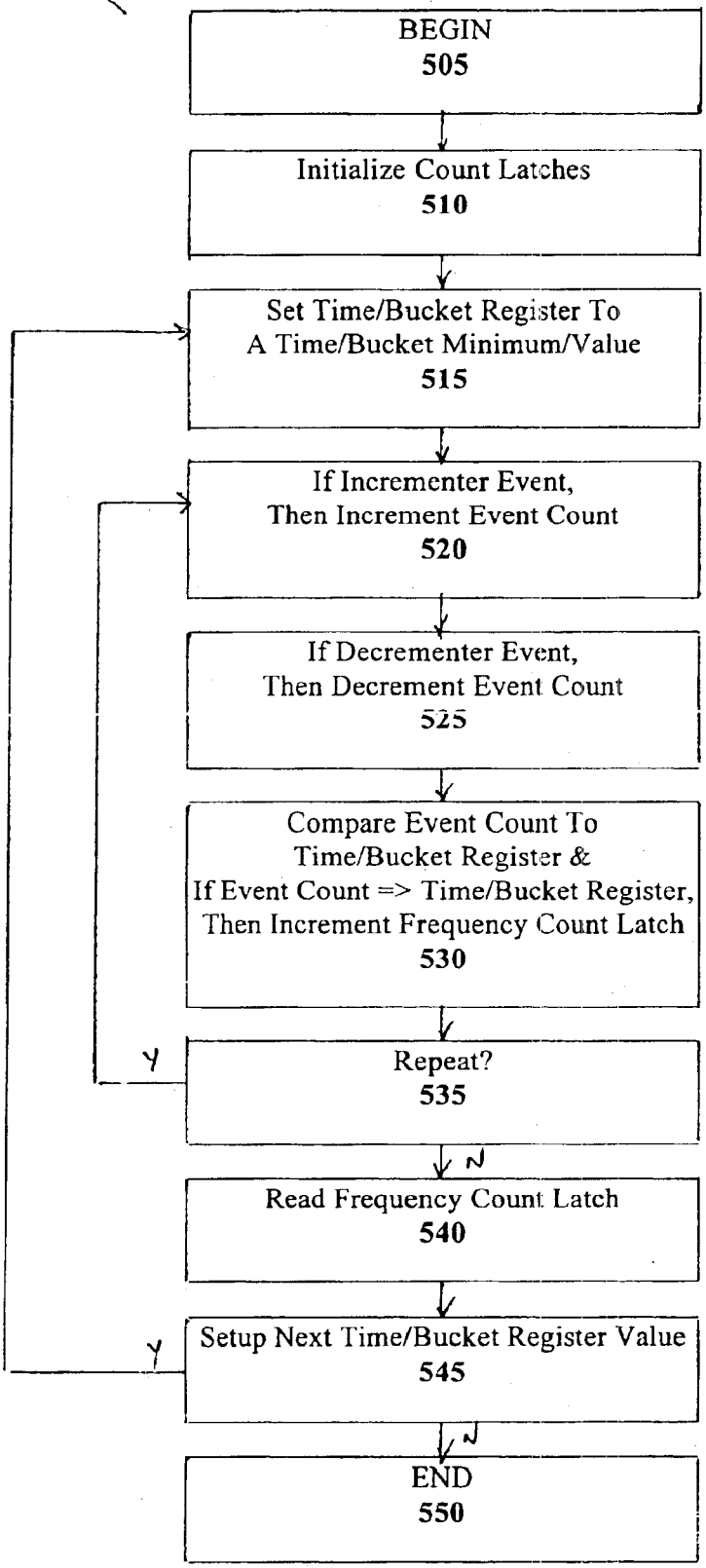
FIG. 5 shows another flowchart of an exemplary embodiment of another aspect of a method that may be implemented using the exemplary embodiments of FIG. 1 and/or FIG. 2.

A variation of the sub-method of FIG. 4 is shown in FIG. 5, which shows a flowchart that details the operations or tasks of an exemplary embodiment of another aspect of the histogramming method that may be used. In particular, the sub-method begins in step 505. Next, in step 510, the system may initialize the count latches 35 and 45. In step 515, the system sets the bucket register arrangement 65 to a minimum bucket value. Next, in step 520, if the system determines that an event is an "incrementer" event, then the adder 40 may be used to increment the event count latch arrangement 35. In step 525, if the system determines that an event is a "decrementer" event, then the adder 40 may be used to decrement the event count latch arrangement 35. In step 530, the comparing arrangement 30 compares the count for an event to the bucket register arrangement value, and if the count for an event is greater than or equal to (or greater than) the bucket register arrangement value, then the adder 50 may be used to increment the frequency count latch arrangement 45. In step 535, the system may then determine whether the foregoing operating steps 515 to 530 are to be repeated based on whether a suitably appropriate end condition, continue condition or other repeat condition is satisfied, which will depend on the particular application. If not, in step 540, the system reads the frequency count latch arrangement 45, sets up the next bucket register arrangement value in step 545, and ends the sub-method in step 550.

In this regard, queue-size histograms may, for example, include the following histogram events. It is again noted, however, that since only one "bucket" of a histogram may be measured per experiment, histograms may be generated for repeatable workloads. As a first example, the system may measure a logic arrangement or chipset-to-memory queue occupancy distribution, which may include the following steps: setting the bucket register to a minimum value of the maximum bucket (that is, a full queue); using an input arrival signal to the chipset-to-memory queue as an incrementer event; using an output departure signal from the chipset-to-memory queue as a decrementer event; and repeating for each minimum bucket value. As another example, the system may determine a bus transfer size distribution on an accelerated graphics processor (AGP) bus, which may include the following steps: setting the bucket register arrangement to a minimum value of the maximum bucket. (That is, the biggest "burst" size); changing operation based on an input arrival signal being provided to the queue to increment the appropriate counter, and on a "bus transaction change" (that is, an extra signal), comparing the counter to the bucket register arrangement value, and if it is greater, then incrementing the frequency counter 45, and if not, resetting the counter, and repeating the "change operation" steps; repeating the foregoing steps for each minimum bucket value.

Figure 6:
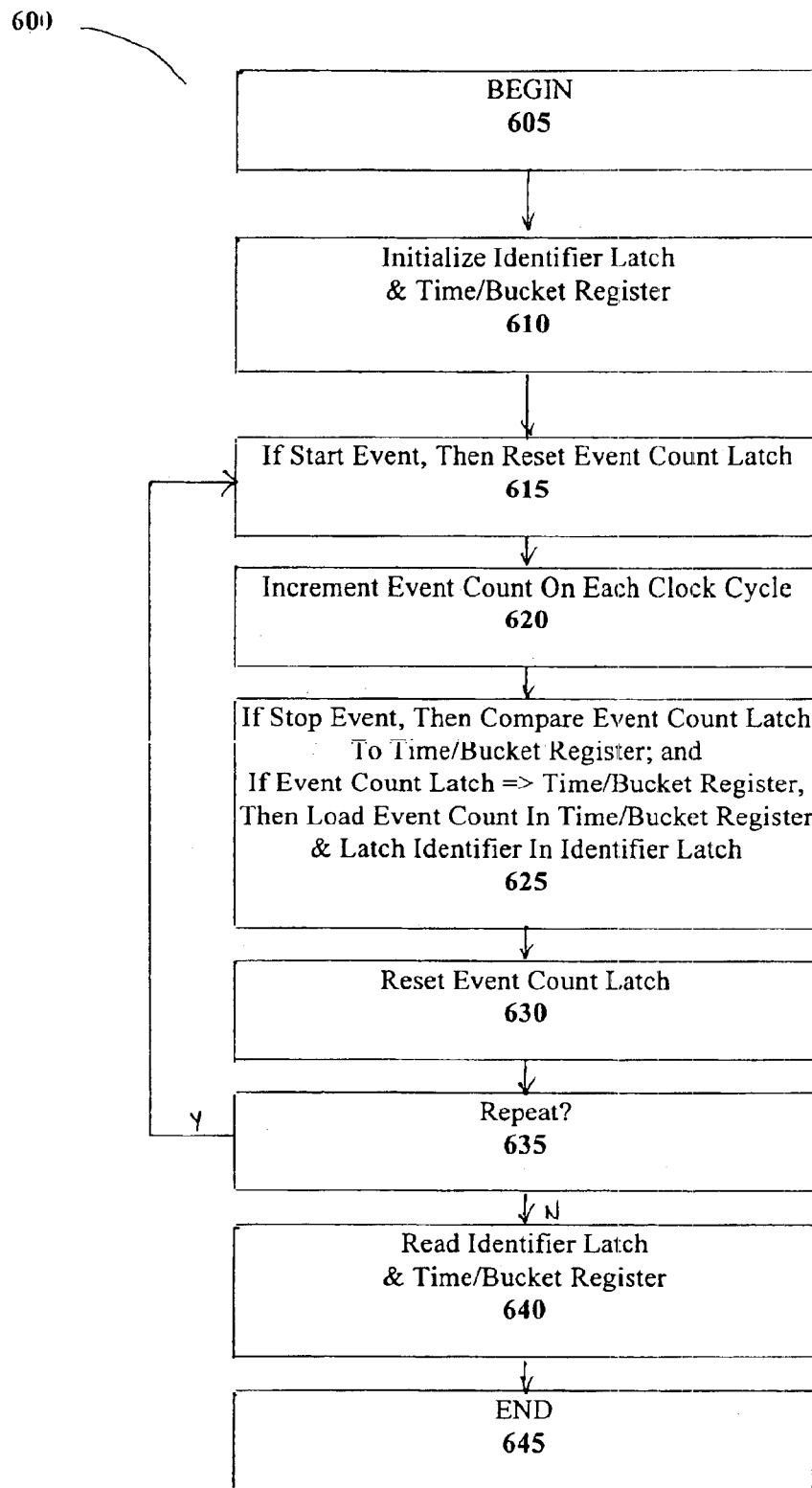
FIG. 6 shows another flowchart of an exemplary embodiment of another aspect of a method that may be implemented using the exemplary embodiments of FIG. 1 and/or FIG. 2.

As shown in FIG. 6, a flowchart details the operations or tasks of an exemplary embodiment of another aspect of the single event identification method that may be used. In particular, the sub-method begins in step 605. Next, in step 610, the system may initialize the identifier latch arrangement 45 and the time register arrangement 65. In step 615, the system may determine whether the event may be a start event, and if it is, then it may reset the event count latch arrangement 35. In step 620, the event count latch arrangement 35 may be incremented by the adder 40 on each clock cycle. In step block 625, the system may determine whether the event may be a stop event, and if it is then the comparing arrangement 30 compares the contents of the event count latch arrangement 35 and the time register arrangement 65. If the count for an event is greater than or equal to (or greater than) the time register arrangement value, then the count for an event may be loaded into the time register arrangement and the system latches in the identifier latch arrangement 45. Next, in step 630, the event count latch arrangement 35 may be initialized or reset. In step 635, the system may determine whether the foregoing operating steps 615 to 630 are to be repeated based on whether a suitably appropriate end condition, continue condition or other repeat condition is satisfied, which will depend on the particular application. If not, in step 640, the system reads the identifier/frequency count latch arrangement 45 and the time register arrangement 65, and ends the sub-method in step 650.

The task of finding and/or identifying single events may, for example, include the following: finding a single fast write using the longest "head" event of a queue blocking time, which may include the steps of using an active or true output arrival signal (that is, a start event) to reset and start the appropriate counter; using an active or true output departure signal (that is, a stop event) to stop the counter and cause the comparing arrangement 30 to compare the count for an event and the time register value, and latching in a transfer address in the identifier latch arrangement 45; finding a cycle that occurs after a maximum "FS buffer" ("FSB") empty time, which may include the steps of using an active or true output departure signal (from the processor bus transaction queue) (that is, a start event) to reset and start the appropriate counter, using an active or true output arrival signal (from the processor bus transaction queue) (that is, a stop event) to stop the appropriate counter and cause the comparing arrangement 30 to compare the count for an event and the time register value, and latching in a transfer address in the identifier latch arrangement 45; and finding a maximum queue service time by using a "head" event of a queue blocking time (that is, the first example measurement), which may provide a suitably appropriate approximation of the maximum queue service time (an actual value may require a "counters per queue" entry.

Also, for example, if graphics cards do not accept write data from the processor for relatively long periods of time (such as milliseconds), this may, for example, cause video or audio glitches. Single event detection instrumentation logic may allow or facilitate the detection of such deficient system usage patterns. In particular, the system instrumentation may only require a relatively simple application to eliminate or find a particular problem in a relatively inexpensive, quick or straightforward way.

Accordingly, there is provided a method for identifying a logic event in a logic environment, the method including: (a) providing one of a reference parameter and a next reference parameter; (b) receiving starting event information corresponding to a logic event, ending event information corresponding to the logic event, and at least one identification parameter information associated with the logic event; (c) determining an actual parameter corresponding to at least one of a duration parameter and a capacity parameter corresponding to the logic event; (d) comparing the actual parameter to the reference parameter and providing a comparison result; and (e) if the comparison result at least indicates that the actual parameter is no less than the reference parameter, performing at least one of replacing the reference parameter with the actual parameter to provide the next reference parameter and providing the at least one identification parameter.

There is also provided an apparatus for identifying a logic event in a logic environment, the apparatus including: a control arrangement for providing one of a reference parameter and a next reference parameter; a receiving arrangement for receiving starting event information corresponding to a logic event, ending event information corresponding to the logic event, and at least one identification parameter information associated with the logic event; a determining arrangement for determining an actual parameter corresponding to at least one of a duration parameter and a capacity parameter corresponding to the logic event; and a comparing arrangement for comparing the actual parameter to the reference parameter and providing a comparison result; wherein if the comparison result at least indicates that the actual parameter is no less than the reference parameter, the control arrangement causes the performance of at least one of replacing the reference parameter with the actual parameter to provide a next reference parameter and providing the at least one identification parameter.

Still further provided is a method for performing at least one of measuring a logic event, determining histogram information of the logic event and identifying a logic event in a logic environment, the method including: (I) selecting at least one of a first mode for measuring the logic event, a second mode for determining the histogram information of the logic event and a third mode for identifying the logic event so as to provide at least one selected operating mode; and (II) performing at least one of the first mode for measuring the logic event, the second mode for determining the histogram information of the logic event and the third mode for identifying the logic event based on the at least one selected operating mode.

There is also provided a system for performing at least one of measuring a logic event, determining histogram information of the logic event and identifying a logic event in a logic environment, the system including: a system controlling arrangement; a comparing arrangement coupled to the system controlling arrangement; a first memory arrangement coupled to the system controlling arrangement and to the comparing arrangement; a first counting arrangement coupled to the system controlling arrangement, the comparing arrangement and to the first memory arrangement; a second memory arrangement coupled to the system controlling arrangement and having a coupling for receiving identifying information for a logic event; and a second counting arrangement coupled to the second memory arrangement.

As referred to above, it is believed that a single event metric of an end of a processor bus queue, and in particular a Head Of Processor Bus Queue (HOPBQ) transaction, may be very useful in characterizing the performance of software and/or hardware, and is explained in the following with respect to an exemplary application.

A bridge arrangement, such as, for example, a set of bridge chips (which may be referred to as a bridge chipset) may be used to couple a main memory to a processor, graphics accelerator, network interface and/or other components of a processing system. The bridge arrangement or bridge chipset may allocate or apportion access to the main memory and help to maintain the main memory. Any delay or latency experienced by the processor in accessing memory may impact negatively an application runtime. To determine or measure this delay or latency, the processor bus may be characterized using the measurement system 10 of FIG. 1. For each application, a suitably appropriate number of samples (such as, for example, several hundred samples having time on the order of about tens of microseconds) may be taken using relatively long and varied delays between the samples. Out of each data set, individual accesses to the main memory may be parsed and aggregated to provide various statistics. The number of samples may be, for example, something on the order of about twice the number of samples for which the data is sufficiently stable.

A processor bus first word (FW) latency may be considered as being a time that the processor must wait from the time of a main memory read/write request on the processor bus until a return of a first data word on the processor bus. The processor bus first word latency may include a memory component latency and a chipset traversal latency in both directions. A chipset/memory performance metric may be, for example, a first word latency for transactions arriving to an otherwise idle chipset and memory or an idle first word latency. As referred to above, while this metric may indicate system performance, it may only be sufficient to adequately describe system performance when each access may be adequately described by placing it in a Page Hit (PH), a Page Empty (PE) or a Page Missing (PM) latency bucket.

The Page Hit may occur when a data page containing a requested data word is already loaded (such as, for example, by a prior access) into a memory buffer (such as, for example, a DRAM buffer) so that the data may be accessed by reading from or writing to the memory buffer. The Page Empty may occur when no page is loaded in the memory buffer so that a memory controller must first load a page containing a requested data word into the memory buffer and then must read or write the data word from or to the memory buffer. The Page Miss may occur when a page loaded in the memory buffer is not the page containing the requested data word so that the memory controller must write the page in the memory buffer back to a memory array and then read or write the desired data from or to the memory buffer.

Thus, for example, a number of the transaction latencies may correspond to idle FW latencies having read peaks appear at PH, PE (100 ns) and PM (120 ns), which may be, for example, on the order of about 80, 100 and 120 nanoseconds depending on the particular application and the hardware, such as, for example, a Pentium® II Processor, Pentium® III Processor or Pentium® Pro Processor, all of which are available from Intel Corp. The chipset may accept or post and complete write transactions on the processor bus before writing to memory to allow any write operations or transactions to finish more quickly. While this may account for a relatively large concentration of write transactions having a FW latency of, for example, 50 ns (which is the first clock on which write data may be transmitted on a pipelined bus of a Pentium® Pro Processor), it is not believed that such idle FW latency may explain the relatively long latency tails that may be present in the read and write distributions. It is believed that this may indicate that idle latencies do not adequately describe the delays or latencies experienced by a processor when it makes memory requests.

In particular, relatively long latency tails may show that any loaded first word latencies should be or may need to be considered. The loaded FW latency may be the FW latency experienced by a processor on a relatively busy chipset/memory subsystem. Contention for the main memory or pipelined processor requests to the main memory may make the loaded FW latency greater than the idle FW latency. While the loaded FW latency may show the longer latencies experienced in real applications, it may double-count some processor bus clocks or clock cycles. Specifically, for a number of X transactions that may be simultaneously outstanding on a pipelined processor bus, the number of clocks may be counted X times. This multiple clock counting may obscure the true behavior of the bus, and may make it difficult to distinguish a relatively slow transaction from a pipelined transaction. The multiple counting of clocks may also make direct calculation of the effect of latency on runtime impractical or impossible. This is because the number of processor bus clocks that the processor may have spent waiting for data to return may be unknown. Accordingly, the loaded FW latency may be inadequate or insufficient to describe system performance.

The Head Of Processor Bus Queue (HOPBQ) time is a metric that has been found to accurately characterize or show the latency of the processor read and write transactions with the main memory. It is believed that this should allow sufficiently accurate estimation of any effect that a chipset/memory latency may have on runtimes for real applications. The Head Of Processor Bus Queue (HOPBQ) transaction time for a transaction Y should equal or at least correspond to the time that the transaction Y is eligible for service. That is, the Head Of Processor Bus Queue (HOPBQ) transaction time for the transaction Y may be the lesser of the following: an elapsed time from a processor request for Y (such as, for example, where ADS# (address line) is sampled for activated or true values on a bus of the Pentium® Pro Processor) to when Y is retired (such as, for example, a later one of a last data clock or a valid response on the bus of the Pentium® Pro Processor); and an elapsed time from when a prior transaction (Y−1) is retired to when Y is retired.

The Head Of Processor Bus Queue (HOPBQ) transaction time differs from the FW latency because it may avoid double counting of clocks by considering outstanding transactions. Also, the Head Of Processor Bus Queue (HOPBQ) transaction time metric may include data phases in the time needed to complete a transaction. The Head Of Processor Bus Queue (HOPBQ) transaction time may include these data phases to describe the time needed to fill a cache line and to describe the bus cycles that delay subsequent data returns (which may be, for example, four clocks that pass one 32-byte cache line on the bus of the Pentium® Pro Processor). It is believed that including the data phases should better predict runtimes than might Head Of Processor Bus Queue (HOPBQ) transaction metrics that exclude such data phase time information.

The write operations or transactions may be either pipelined, which may involve spending no more than the time (such as, for example, 50 ns) that may be required to transfer data after a transaction is at the head of a queue, or it may arrive at an otherwise idle processor bus and be completed in a time (such as, for example, 80 ns) that corresponds to an FW time (such as, for example, 50 ns) and a time that corresponds to the last word and the retiring of a transaction (such as, for example, 30 ns). If no tail appears in the distribution for the write transactions, this may indicate that the long FW latency for the write transactions may be associated with a write transaction following a read transaction. A minimum round trip time corresponding to an Head Of Processor Bus Queue (HOPBQ) transaction latency for a read may be, for example, on the order of about 110 ns (depending on the application and hardware), but a number of the read operations or transactions may be pipelined. The pipelined read transactions may use less time (such as, for example, less than 110 ns) as an eligible transaction at the head of the processor bus queue. Relatively strong peaks for majority of the remaining read transactions (at, for example, 110, 130 and 150 ns) may indicate that the read transactions are with an idle memory bus, which resulted in PH, PE and/or PM latencies that correspond to the 80, 100, and 120 nanosecond FW latencies plus the time (such as, for example, about 30 ns) that may be needed to transfer the remainder of the cache line.

Using the system of FIG. 1 and/or FIG. 2, together with the above methods, it may be demonstrated, for example, how different memory arrangements (or other processor service components) may produce different application runtimes. A new memory may, for example, improve application runtimes by increasing the number of low-latency Page Hits (PHs), reducing the number of Page Misses (PMs) and allowing rapid streaming of pipelined data. Since the write transactions may be posted, the processor time waiting for the main memory may be associated with waiting for the read transactions (and not the write transactions) to complete. A plot of only read HOPBQ times may be used, for example, to show any relatively strong peaks, and to further show how an improved memory may redistribute such long latency PM peaks to shorter latency Page Hits to improve application runtimes.

The Head Of Processor Bus Queue (HOPBQ) transaction distribution may also be used to determine application runtimes. For no overlap between processor operations and main memory accesses (in which the processor waits for data returns from outstanding transactions), a total application runtime should correspond to a sum of three time components. These time components may include the following: a processor or CPU time corresponding to processor operation times; a processor bus or CPUBus time corresponding to wait times for data returning from the memory (which may equal the sum of the Head Of Processor Bus Queue (HOPBQ) transaction time for every transaction); and a graphics controller or GC time corresponding to a time associated with an inactive processor and memory bus, which may correspond to, for example, wait times for a graphics controller to complete operations. Accordingly, the application runtime may be determined by the following relationship: R=CPU+CPUBus+GC.

For at least some applications, the parameter GC may be considered to be about or equal to zero so that it may be ignored in such applications. By defining $R_{old}$ as an old or reference application runtime and $R_{new}$ as a new estimated runtime of the same application (which may associated, for example, with a design change in a memory subsystem), and since the CPU time may be independent of the data return time, the following relationship may be provided:

$$R_{new} = R_{old} - CPUBus_{old} + CPUBus_{new}, \text{ and}$$

$$R_{new}/R_{old} = 1 - CPUBus_{old}/R_{old} + CPUBus_{new}/R_{old}.$$

A bus read utilization Util, which corresponds to a ratio of the processor bus time CPUBus to the application runtime R, may then be substituted to eliminate all $R_{old}$ terms on the right so that:

$$R_{new}/R_{old} = 1 - Util_{old} + CPUBus_{new}/CPUBus_{old} * Util_{old}.$$

The CPUBus time may be considered to correspond to or equal the average transaction or Head Of Processor Bus Queue transaction time ($HOPBQ_{avg}$) multiplied by a number of accesses that may occur when the program is executing, and if the processor does not often wait for the write transactions to return so that they may be ignored, the following relationship results:

$$R_{new}/R_{old} = 1 - Util_{old} + (HOPBQ_{avg,new}/HOPBQ_{avg,old} * \#reads_{new}/\#reads_{old}) * Util_{old}.$$

Finally, if the total number of read transactions required to execute a repeatable, deterministic workload (for completing a benchmark run) is assumed to be constant, the following relationship may be obtained:

$$R_{new}/R_{old} = 1 - Util_{old} + HOPBQ_{avg,new}/HOPBQ_{avg,old} * Util_{old}, \text{ or}$$

$$R_{new} = (1 - Util_{old} + HOPBQ_{avg,new}/HOPBQ_{avg,old} * Util_{old}) * R_{old}.$$

The old application runtime $R_{old}$ may be measured directly by, for example, timing an application runtime using, for example, a base or reference hardware/software configuration. The average values for the old $HOPBQ_{old}$ transaction times and the old utilization factor $Util_{old}$ may be determined or statistically estimated by sampling the processor (CPU) bus by using the system of FIG. 1 and/or FIG. 2. The new $HOPBQ_{new}$ transaction time may then be estimated by, for example, time shifting the histogram based on an expected shift that may be associated with a considered change in the system configuration. This should provide the information that may be required to determine the improved application runtimes that may be associated with changes in the performance of new memory configurations or the performance of other new processor service systems (other than memory).

In particular, exemplary uses for applying such a HOPBQ histogram methodology may include predicting the performance increase for a previously runtime-characterized software/hardware application when there may be a desired change in: the memory performance; the way a disk is accessed (such as, for example, DMA (direct memory access) as compared to PIO (programmed input-output); the way in which the graphics controller is addressed (such as, for example, moving long latency direct writes to a graphics controller (GC) to memory so that rapid memory writes that are then read by the GC; the buffering schemes within a chipset; the address stream coming from a process of a processor either by changing the program or the operating system. In such cases, by mapping an expected change in operating behavior to a particular change in a benchmark or reference histogram, and by extending this expected change to the benchmark or reference histogram, such as by time shifting the histogram or otherwise modifying the reference histogram based on the expected operating performance changes, an estimated runtime for an application that reflects a desired change in the system hardware and/or software, as discussed above.

Additionally, the Head Of Processor Bus Queue (HOPBQ) transaction information may be used to identify deficiencies in system performance. In particular, for example, unexpected peeks in a histogram may indicate where to focus attention in tuning the system or in future system design. Thus, for example, a histogram peak at about at a clocking point (such as, for example, 80 clocks) may suggest that an associated operating mode (such as, for example, a direct memory access (DMA) mode) is not operating or is not on. Also, for example, if a substantial part of an HOPBQ transaction distribution is above PH latency and below PM latency and application utilization is relatively high, then this may suggest, for example, that the idle first word latency is important to the performance of an application.

Thus, there is provided a method for determining an estimated runtime of a software application, the method including: (a) providing a reference runtime of the software application for a reference system configuration, wherein the reference system configuration includes a processor, a processor bus and at least one processor service component; (b) providing a processor bus utilization parameter associated with the reference system configuration; (c) providing a first processor bus queue statistic associated with the reference runtime; (d) providing a second processor bus queue statistic associated with the reference runtime; and (e) determining the estimated runtime based on the reference runtime, the processor bus utilization parameter, the first processor bus queue statistic and the second processor bus queue statistic.

There is also provided an apparatus for determining an estimated runtime of a software application, the apparatus including: an arrangement for providing: a reference runtime of the software application for a reference system configuration, wherein the reference system configuration includes a processor, a processor bus and at least one processor service component; a processor bus utilization parameter associated with the reference system configuration; a first processor bus queue statistic associated with the reference runtime; a second processor bus queue statistic associated with the reference runtime; and another arrangement for determining the estimated runtime based on the reference runtime, the processor bus utilization parameter, the first processor bus queue statistic and the second processor bus queue statistic.

What is claimed is:

1. A system, comprising:
   a host bus to transfer at least one of information and instructions;
   a peripheral interface bus to interface to at least one peripheral;
   a processor arrangement coupled to the host bus, the processor arrangement including an execution unit to execute instructions;
   a main memory coupled to the host bus to store the instructions;
   a read-only-memory coupled to the host bus to store information for use by the processor arrangement;
   a bridge device to communicate information between the host bus and the peripheral interface bus, the bridge device including a multi-mode measurement arrangement to measure at least one of a metric and a performance parameter of the system, wherein the system is operable to perform the following steps:
   (a) providing one of a reference parameter and a next reference parameter;
   (b) receiving starting event information corresponding to a logic event, ending event information corresponding to the logic event, and at least one identification parameter information associated with the logic event;
   (c) determining an actual parameter corresponding to at least one of a duration parameter and a capacity parameter corresponding to the logic event;
   (d) comparing the actual parameter to the reference parameter and providing a comparison result; and
   (e) if the comparison result at least indicates that the actual parameter is no less than the reference parameter, performing at least one of replacing the reference parameter with the actual parameter to provide the next reference parameter and providing the at least one identification parameter.

2. The system of claim 1, wherein the multi-mode measurement device is operable in an event-counting mode, an event-histogram mode, and a single event identification mode.

3. The system of claim 1, wherein the peripheral interface bus includes a peripheral component interconnect (PCI) bus.

4. The system of claim 1, wherein the at least one peripheral include a mass storage device coupled to the peripheral interface bus, and a data storage medium coupled to the mass storage device to store at least one of measurement data representation software and frequency distribution representation software.

5. The system of claim 4, wherein the mass storage device includes a CD-ROM drive.

6. The system of claim 4, wherein the data storage medium includes a compact disc read-only memory (CD-ROM).

7. The system of claim 4, wherein the at least one of the measurement data representation software and the frequency distribution representation software include user interface software to interact with a user via an input device and a display device.

8. The system of claim 1, further comprising:
   an input device to receive input; and
   a display device to display information.

9. The system of claim 8, wherein the input device includes at least one of a keyboard and a cursor device.

10. The system of claim 8, wherein the display device includes as least one of a monitor and a liquid crystal display.

11. A method of determining an inter-arrival time distribution for a processor bus queue, comprising:
    (a) setting a bucket register to a minimum value of a maximum histogram bucket value;
    (b) using an active input arrival signal from the processor bus queue to reset and start a counter;
    (c) using an inactive input arrival signal from the processor bus queue to stop the counter and cause a comparing arrangement to compare a count for an event and a bucket register value, and to reset the counter; and
    (d) repeating steps (a) through (c) for each minimum bucket value.

12. The method of claim 11, wherein the processor bus queue includes one of a processor bus transaction queue and a processor bus in-order-queue.

13. The method of claim 11, wherein the processor bus queue includes a head of processor bus queue (HOPBQ).

14. A method of identifying a maximum queue service time, comprising:
    using a first active output arrival signal to reset and start a counter;
    using a first active output departure signal to stop the counter and cause a comparing arrangement to compare a count for a first event and a time register value;
    latching in a first transfer address in an identifier latch arrangement;
    finding a cycle that occurs after a maximum buffer empty time; and
    using a head event of a queue blocking time to find the maximum queue service time.

15. The method of claim 14, wherein the step of finding a cycle that occurs after a maximum buffer empty time includes:
    using a second active output departure signal to reset and start a second counter;
    using a second active output arrival signal to stop the second counter and cause the comparing arrangement to compare a count for a second event and the time register value; and
    latching in a second transfer address in the identifier latch arrangement.

16. The method of claim 14, wherein the second active output departure and arrival signals are associated with a processor bus transaction queue.

* * * * *